(12) United States Patent
Teraoka et al.

(10) Patent No.: US 9,759,888 B2
(45) Date of Patent: Sep. 12, 2017

(54) LENS ASSEMBLY FOR BIOLOGIC CHARACTERISTIC IDENTIFICATION

(71) Applicants: Hiroyuki Teraoka, Kyoto (JP); Jesper Falden Offersgaard, Farum (DK)

(72) Inventors: Hiroyuki Teraoka, Kyoto (JP); Jesper Falden Offersgaard, Farum (DK)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/225,302

(22) Filed: Aug. 1, 2016

(65) Prior Publication Data

US 2017/0082831 A1    Mar. 23, 2017

(30) Foreign Application Priority Data

Sep. 18, 2015  (JP) ................................. 2015-186001
Apr. 30, 2016  (CN) .......................... 2016 1 0282055

(51) Int. Cl.
*G02B 9/04* (2006.01)
*G02B 9/10* (2006.01)
*G02B 13/00* (2006.01)

(52) U.S. Cl.
CPC ............. *G02B 9/10* (2013.01); *G02B 13/003* (2013.01)

(58) Field of Classification Search
CPC ................................ G02B 9/10; G02B 13/003
See application file for complete search history.

(56) References Cited

U.S. PATENT DOCUMENTS

2013/0250442 A1*  9/2013  Hsieh .................. G02B 13/003
359/717

* cited by examiner

*Primary Examiner* — Joseph P Martinez
(74) *Attorney, Agent, or Firm* — Na Xu; IPro, PLLC

(57) ABSTRACT

A lens assembly for biologic characteristic identification is provided in the present disclosure. The lens assembly includes a first lens with positive refractive power and a second lens with negative refractive power, arranged in sequence from the object side to the image side and satisfy conditions: $-0.95 \leq f1/f2 \leq -0.68$; $0.10 \leq d1/f \leq 0.20$; $0.24 \leq d2/f \leq 0.50$; $-3.50 \leq (R1+R2)/(R1-R2) \leq -1.80$; f is the focal length of the lens assembly, f1 and f2 is the focal lengths of the first lens and the second lens, d1 and d2 is the central thickness of the first lens and the axial distance from the image side of the first lens to the object side of the second lens, R1 and R2 is the curvature radius of the object side and the image side of the first lens.

3 Claims, 5 Drawing Sheets

LENS ASSEMBLY FOR BIOLOGIC CHARACTERISTIC IDENTIFICATION

FIELD OF THE DISCLOSURE

The present invention relates to optical technologies, and more particular, to a lens assembly with good optical characteristics, which is applicable to biologic characteristic identification such as vein identification or iris identification.

BACKGROUND

Recently, biologic characteristic identification, such as fingerprint identification, vein identification, iris identification, or the like, are used more and more widely for personal information confirmation due to better information security. A Lens assembly with good optical characteristic and a narrow view angle range is normally desired in biologic characteristic identification to ensure identification accuracy.

The lens assembly disclosed in Japanese patent publication No. 2007-147830 includes a first lens with negative refractive power and a second lens with positive refractive power. However, a view angle of the lens assembly is too wide and is inapplicable to biologic characteristic identification.

The lens assembly disclosed in Japanese patent publication No. 2013-218353 includes a first lens and a second lens. However, the distribution of the refractive power of the first lens and the second lens, the proportion of the central thickness of the first lens to the focal length of the lens assembly, the proportion of the axial distance from the image side of the first lens to the object side of the second lens to the focal length of the lens assembly are not fully. So the view angle of the lens assembly is too wide and is inapplicable to biologic characteristic identification.

The lens assembly disclosed in Japanese patent publication No. 2012-108449 includes a first lens and a second lens. However, the distribution of the refractive power of the first lens and the second lens, the proportion of the cenreal thickness of the first lens to the focal length of the lens assembly, the shape of the first lens are not fully. So the view angle of the lens assembly is too wide and is inapplicable to biologic characteristic identification.

Accordingly, an improved lens assembly for biologic characteristic identification which can overcome the disadvantages described above is desired.

BRIEF DESCRIPTION OF THE DRAWINGS

Many aspects of the embodiment can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present invention will hereinafter be described in detail with reference to several embodiments.

Figure 1:
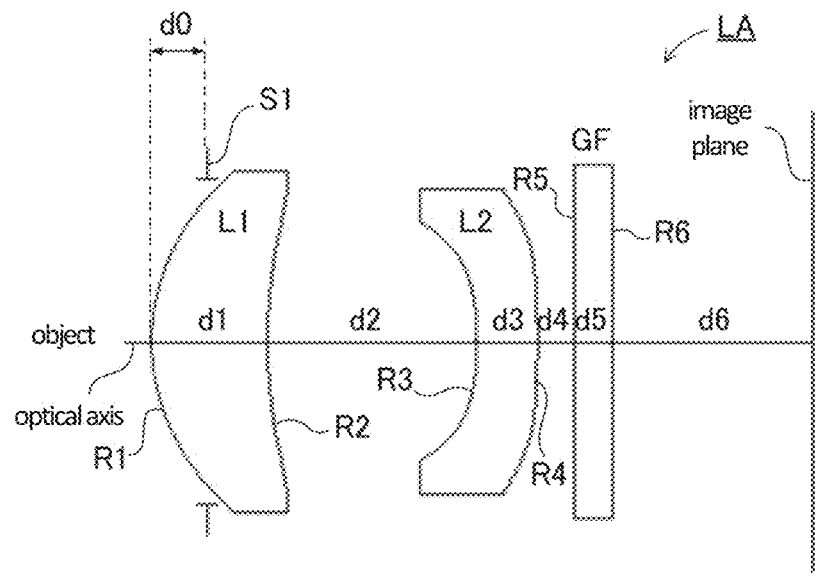
FIG. 1 is a structural diagram of a lens assembly related to an embodiment of the present disclosure.

Referring to FIG. 1, a lens assembly LA according to the first embodiment of the present disclosure is shown. The lens assembly LA includes a lens set with two lenses, that is, a first lens L1 and a second lens L2, which are arranged in that order from the object side to the image side. A glass filter GF may optionally be arranged between the second lens L2 and an image surface. Alternatively, the glass filter GF may be arranged in other location or even removed from the lens assembly LA.

The first lens L1 has a positive refractive power, and the second lens L2 has a negative refractive power. In practice, the first lens L1 and the second lens L2 is designed to have aspheric surfaces, so as to compensate aberration in the lens assembly LA.

The lens assembly LA as provided in the present embodiment is a lens assembly applicable to biologic characteristic identification, which satisfies the following conditions (1) to (4):

$$-0.95 \leq f1/f2 \leq -0.68 \tag{1}$$

$$0.10 \leq d1/f \leq 0.20 \tag{2}$$

$$0.24 \leq d2/f \leq 0.50 \tag{3}$$

$$-3.50 \leq (R1+R2)/(R1-R2) \leq -1.80 \tag{4}$$

In which:
f is the focal length of the lens assembly LA;
f1 is the focal length of the first lens L1;
f2 is the focal length of the second lens L2;
d1 is the central thickness of the first lens L1;
d2 is the axial distance from the image side of the first lens L1 to the object side of the second lens L2;
R1 is the curvature radius of the object side of the first lens L1; and
R2 is the curvature radius of the image side of the first lens L1.

The condition (1) defines the proportion of the focal length between the first lens L1 and the second lens L2; if the proportion value f1/f2 is beyond the value range defined in condition (1), the lens assembly LA may not meet miniaturization and narrow view angle requirements. In addition, the proportion value f1/f2 in condition (1) is preferred to be set in the value range as defined in the following condition (1-A):

$$-0.90 \leq f1/f2 \leq -0.70 \tag{1-A}$$

The condition (2) defines the proportion between the central thickness of the first lens L1 and the focal length of the lens assembly. If the proportion value d1/f is beyond the value range defined in condition (2), the lens assembly LA may not meet miniaturization and narrow view angle requirements. In addition, the proportion value d1/f in condition (2) is preferred to be set in the value range as defined in the following condition (2-A):

$$0.13 \leq d1/f \leq 0.17 \tag{2-A}$$

The condition (3) defines the proportion between the axial distance from the image side of the first lens L1 to the object side of the second lens L2 and the focal length of the lens assembly. If the proportion value d2/f is beyond the value range defined in condition (3), the lens assembly LA may not meet miniaturization and narrow view angle requirements. In addition, the proportion value d2/f in condition (3) is preferred to be set in the value range as defined in the following condition (3-A):

$$0.25 \leq d2/f \leq 0.40 \tag{3-A}$$

The condition (4) defines the shape of the first lens L1. If the proportion value (R1+R2)/(R1−R2) is beyond the value range defined in condition (4), the lens assembly LA may not meet miniaturization and narrow view angle requirements. In addition, the proportion value (R1+R2)/(R1−R2) in condition (4) is preferred to be set in the value range as defined in the following condition (4-A):

$$-2.80 \leq (R1+R2)/(R1-R2) \leq -1.80 \tag{4-A}$$

The second lens L2 has a positive refractive power. The lens assembly LA as provided in the present embodiment is a lens assembly applicable to biologic characteristic identification, which satisfies the following conditions (5) and (6):

$$-1.50 \leq (R3+R4)/(R3-R4) \leq -0.50 \tag{5}$$

$$0.05 \leq d3/f \leq 0.30 \tag{6}$$

In the above conditions (5) and (6),

R3 is the curvature radius of the object side of the second lens L2;

R4 is the curvature radius of the image side of the second lens L2;

f is the focal length of the lens assembly; and d3 is the central thickness of the second lens L2.

The condition (5) defines the shape of the second lens L2. If the proportion value (R3+R4)/(R3−R4) is beyond the value range defined in condition (5), the lens assembly LA may not meet miniaturization and narrow view angle requirements. In addition, the proportion value (R3+R4)/(R3−R4) in condition (5) is preferred to be set in the value range as defined in the following condition (5-A):

$$-1.10 \leq (R3+R4)/(R3-R4) \leq -0.60 \tag{5-A}$$

The condition (6) defines the proportion between the central thickness of the second lens L2 and the focal length of the lens assembly. If the proportion value d3/f is beyond the value range defined in condition (6), the lens assembly LA may not meet miniaturization and narrow view angle requirements. In addition, the proportion value d3/f in condition (6) is preferred to be set in the value range as defined in the following condition (6-A):

$$0.06 \leq d3/f \leq 0.20 \tag{6-A}$$

Upon the condition that the first lens L1 and the second lens L2 satisfy the aforesaid condition formulae, the lens assembly LA is possible to have good optical characteristic, as well as a narrow view angle less than 35° (i.e., 2ω≤35°). Accordingly, the lens assembly LA with the first lens L1 and the second lens L2 is applicable to biologic characteristic identification such as fingerprint identification, vein identification, iris identification, or the like, in a wavelength range from 750 nm to 900 nm.

The following description describes the lens assembly LA according to the present disclosure in detail with reference to several embodiments; parameters of the lens assembly are defined as follows, in which the unit of each of distance, radius, and central thickness is millimeter (mm):

f: the focal length of the lens assembly LA;

f1: the focal length of the first lens L1;

f2: the focal length of the second lens L2;

Fno: F-number;

2ω: full view angle;

S1: aperture stop;

R: curvature radius of optical surface, and may also becentral curvature radius of lens;

R1: the curvature radius of the object side of the first lens L1;

R2: the curvature radius of the image side of the first lens L1;

R3: the curvature radius of the object side of the second lens L2;

R4: the curvature radius of the image side of the second lens L2;

d: central thickness of lens or axial distance between lenses;

d0: the axial distance between the aperture stop and the object side of the first lens L1;

d1: the central thickness of the first lens L1;

d2: the axial distance between the image side of the first lens L1 and the object side of the second lens L2;

d3: the central thickness of the second lens L2;

d4: the axial distance between the image side of the second lens L2 and the object side of the glass filter GF;

d5: the central thickness of the glass filter GF;

d6: the axial distance between the image side of the glass filter GF and the image plane;

nd: d line refraction index;

n1: d line refraction index of the first lens L1;

n2: d line refraction index of the second lens L2;

n3: d line refraction index of the glass filter GF;

v: abbe number (i.e., dispersion coefficient)

v1: abbe number of the first lens L1;

v2: abbe number of the second lens L2;

v3: abbe number of the glass plate GF;

TTL: the total track length (i.e., the axial distance between the object side of the first lens L1 and the image plane);

LB: the axial distance between the image side of the second lens L2 and the image plane (including the thickness of the glass plate GF); and IH: the image height.

$$y=(x^2/R)/[1+\{1-(k+1)(x^2/R^2)\}^{1/2}]+A4x^4+A6x^6+A8x^8+A10x^{10}+A12x^{12}+A14x^{14} \tag{7}$$

In the above condition (7), R refers to the axial curvature radius, k refers to the conic coefficient, and A4, A6, A8, A10, A12, A14 and A14 are aspherical coefficients.

Optionally, aspherical surfaces of the lenses L1-L2 may be obtained according to condition (7); alternatively, the aspherical surfaces may also be obtained according to other conditions.

Embodiment 1

Figure 2:
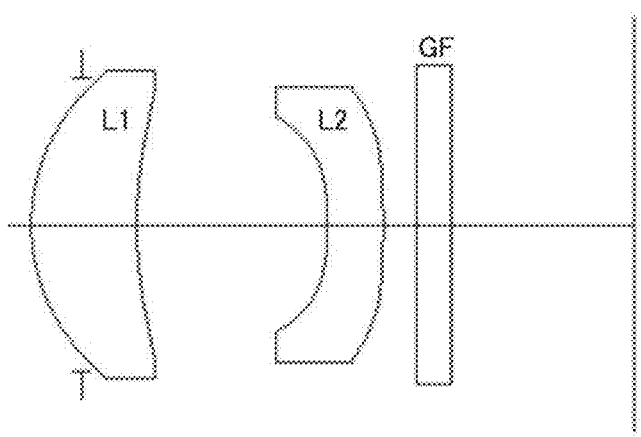
FIG. 2 is a structural diagram of a lens assembly in accordance with the first embodiment of the present disclosure.

FIG. 2 illustrated a lens assembly LA in accordance with the first embodiment of the present disclosure. TABLE 1 and TABLE 2 show the detailed optical data of the lens assembly LA.

The optical data in TABLE 1 includes the curvature radius R, the central thickness d, the axial distance d between lenses, refraction index nd and abbe number ν of the first lens L1 and the second lens L2 in the lens assembly LA. The optical data in TABLE 2 includes conic coefficient (C-coefficient) k and aspherical coefficient of the first lens L1 and the second lens L2 in the lens assembly LA.

TABLE 1

| | R | d | | nd | ν |
|---|---|---|---|---|---|
| S1 | ∞ | d0 = | −0.300 | | |
| R1 | 1.080 | d1 = | 0.628 | n1 1.583 | ν1 59.4 |
| R2 | 2.513 | d2 = | 1.135 | | |
| R3 | −1.825 | d3 = | 0.327 | n2 1.583 | ν2 59.4 |
| R4 | −28.526 | d4 = | 0.200 | | |
| R5 | ∞ | d5 = | 0.210 | n4 1.517 | ν4 64.2 |
| R6 | ∞ | d6 = | 1.086 | | |

TABLE 2

| | C-coefficient | aspherical coefficient | | | | | |
|---|---|---|---|---|---|---|---|
| | k | A4 | A6 | A8 | A10 | A12 | A14 |
| R1 | −1.836E−01 | −3.413E−02 | 1.232E−02 | −1.736E−02 | 5.455E−02 | −3.821E−02 | −5.967E−02 |
| R2 | −2.095E+01 | 8.485E−01 | −1.071E−01 | 3.635E−01 | −7.780E−01 | 5.089E−01 | −1.261E−01 |
| R3 | −7.514E−01 | −6.322E−01 | −2.737E+00 | 1.092E+01 | −2.145E+01 | −1.484E+01 | 5.893E+01 |
| R4 | 0.000E+00 | −5.623E−01 | 4.796E−01 | −8.914E−01 | 1.058E+00 | −4.613E−01 | 2.121E−01 |

The relevant optical data of the lens assembly LA in the first embodiment and the values defined in the aforesaid conditions (1) to (6) are shown in TABLE 5 as provided in the subsequent paragraphs. The designed wavelength in the first embodiment is 820 nm.

As can be seen in TABLE 5, the lens assembly LA in the first embodiment satisfies the aforesaid conditions (1) to (6).

Figure 3:
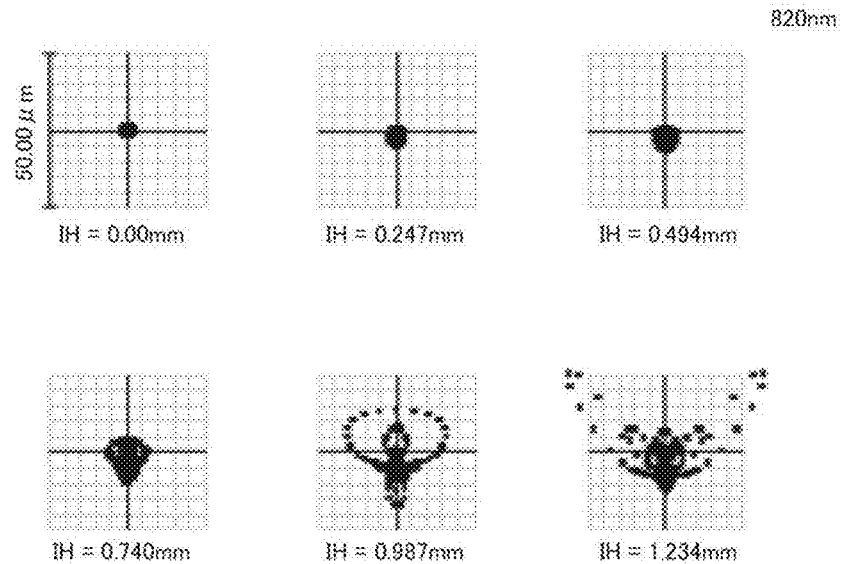
FIG. 3 is the spot diagram of the lens assembly of FIG. 2.
Figure 4:
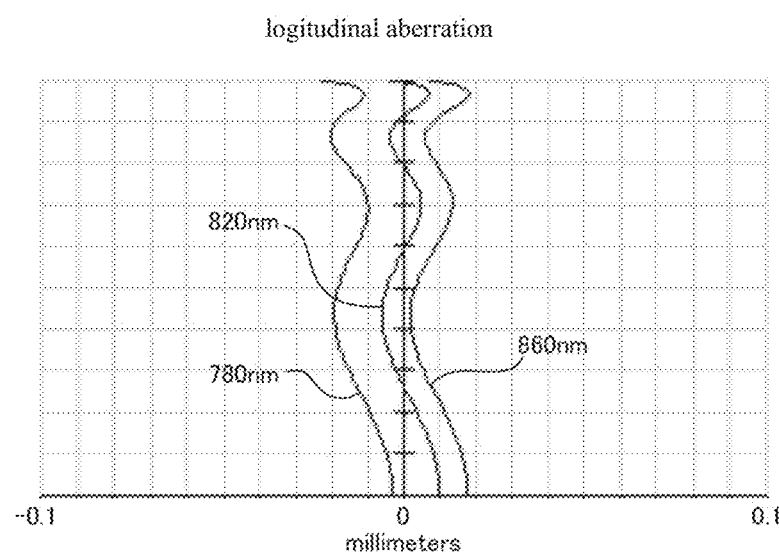
FIG. 4 is the longitudinal aberration of the lens assembly of FIG. 2.
Figure 5:
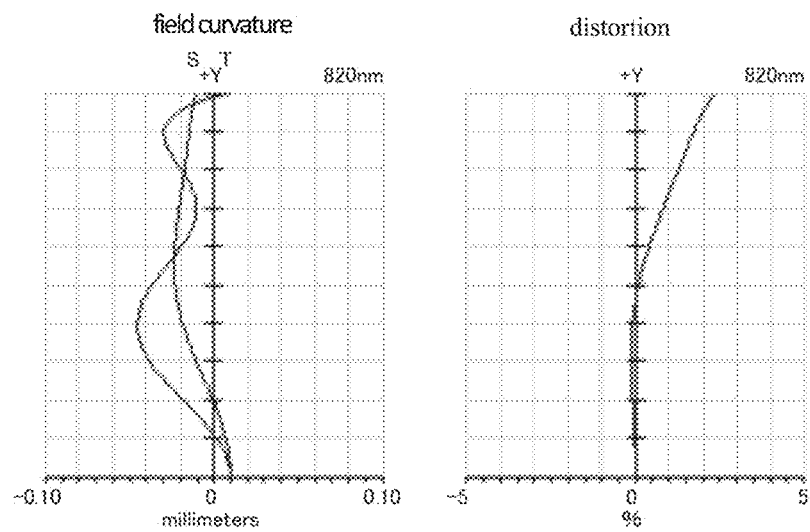
FIG. 5 is the field curvature and distortion of the lens assembly of FIG. 2.

FIGS. 3-5 schematically illustrate the spot diagram, the longitudinal aberration, the field curvature and distortion of the lens assembly LA as provided in the first embodiment respectively. In FIG. 5, curve S represents the field curvature related to the sagittal plane, and curve T represents the field curvature related to the tangential plane. As can be seen, in the first embodiment, the view angle 2ω of the lens assembly LA is 32.0°, and the total track length (TTL) of the lens assembly LA is 3.586 mm. In other words, the lens assembly LA as provided in the first embodiment has a narrow view angle and is small-size, and accordingly has good optical characteristics.

Embodiment 2

Figure 6:
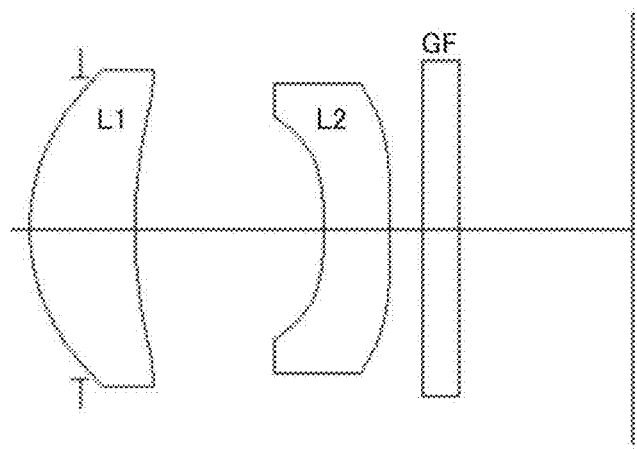
FIG. 6 is a structural diagram of a lens assembly in accordance with the second embodiment of the present disclosure.

FIG. 6 illustrated a lens assembly LA in accordance with the second embodiment of the present disclosure. TABLE 3 and TABLE 4 show the detailed optical data of the lens assembly LA in the second embodiment.

The optical data in TABLE 3 includes the curvature radius R, the central thickness d, the axial distance d between lenses, refraction index nd and abbe number ν of the first lens L1 and the second lens L2 in the lens assembly LA according to the second embodiment. The optical data in TABLE 4 includes conic coefficient (C-coefficient) k and aspherical coefficient of the first lens L1 and the second lens L2 in the lens assembly LA according to the second embodiment.

TABLE 3

| | R | d | | nd | ν |
|---|---|---|---|---|---|
| S1 | ∞ | d0 = | −0.300 | | |
| R1 | 1.078 | d1 = | 0.627 | n1 1.583 | ν1 59.4 |
| R2 | 2.534 | d2 = | 1.130 | | |
| R3 | −1.909 | d3 = | 0.392 | n2 1.583 | ν2 59.4 |
| R4 | −512.014 | d4 = | 0.200 | | |

TABLE 3-continued

| | R | d | | nd | ν |
|---|---|---|---|---|---|
| R5 | ∞ | d5 = | 0.210 | n4 1.517 | ν4 64.2 |
| R6 | ∞ | d6 = | 1.041 | | |

TABLE 4

| | C-coefficient | aspherical coefficient | | | | | |
|---|---|---|---|---|---|---|---|
| | k | A4 | A6 | A8 | A10 | A12 | A14 |
| R1 | −1.834E−01 | −3.347E−02 | 1.503E−02 | −2.143E−02 | 4.967E−02 | −3.992E−02 | −5.668E−02 |
| R2 | −1.888E+01 | 7.838E−02 | −1.114E−01 | 3.627E−01 | −7.780E−01 | 5.094E−01 | −1.229E−01 |
| R3 | −1.846E−01 | −6.481E−01 | −2.693E+00 | 1.110E+01 | −2.125E+01 | −1.524E+01 | 5.642E+01 |
| R4 | 0.000E+00 | −5.408E−01 | 5.014E−01 | −8.777E−01 | 1.042E+00 | −5.111E−01 | 1.486E−01 |

The relevant optical data of the lens assembly LA in the second embodiment and the values defined in the aforesaid conditions (1) to (6) are also shown in TABLE 5 as provided in the subsequent paragraphs. The designed wavelength in the second embodiment is also 820 nm. As can be seen in TABLE 5, the lens assembly LA in the second embodiment satisfies the aforesaid conditions (1) to (6).

Figure 7:
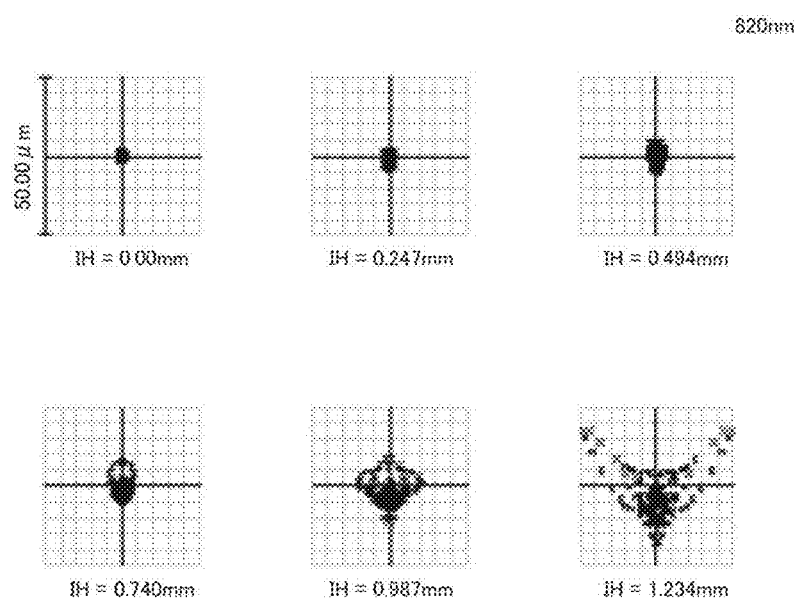
FIG. 7 is the spot diagram of the lens assembly of FIG. 6.
Figure 8:
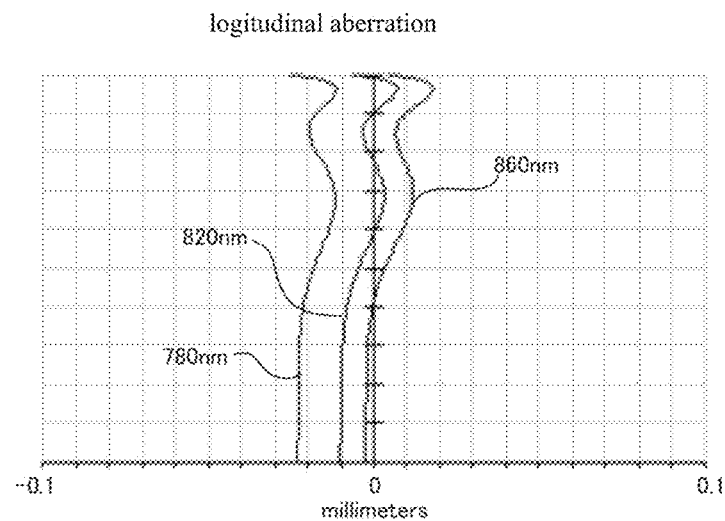
FIG. 8 is the longitudinal aberration of the lens assembly of FIG. 6.
Figure 9:
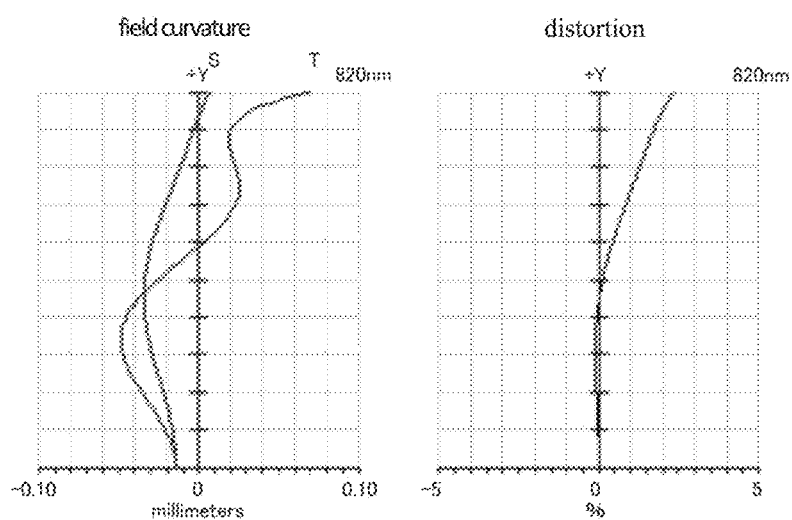
FIG. 9 is the field curvature and distortion of lens assembly of FIG. 6.

FIGS. 7-9 schematically illustrate the spot diagram, longitudinal aberration, the field curvature and distortion of the lens assembly LA as provided in the second embodiment respectively. In FIG. 9, curve S represents the field curvature related to the sagittal plane, and curve T represents the field curvature related to the tangential plane. As can be seen, in the second embodiment, the view angle 2ω of the lens assembly LA is 32.0°, and the total track length (TTL) of the lens assembly LA is 3.600 mm. In other words, the lens assembly LA as provided in the second embodiment has a narrow view angle and is small-size, and accordingly has good optical characteristics.

TABLE 5 shows the values of the lens assembly LA in relevant to the conditions (1) to (6) according to both the first embodiment and the second embodiment. Moreover, in TABLE 5, the unit of the value 2ω is degree)(°, and the units of the values f, f1, f2, TTL, LB and IH are millimeter (mm).

TABLE 5

|  | Embodiment 1 | Embodiment 2 | Formulae |
|---|---|---|---|
| f1/f2 | −0.834 | −0.846 | Formula (1) |
| d1/f | 0.149 | 0.150 | Formula (2) |
| d2/f | 0.269 | 0.270 | Formula (3) |
| (R1 + R2)/(R1 − R2) | −2.508 | −2.481 | Formula (4) |
| (R3 + R4)/(R3 − R4) | −1.137 | −1.007 | Formula (5) |
| d3/f | 0.077 | 0.094 | Formula (6) |
| Fno | 2.4 | 2.4 |  |
| 2ω | 32.0 | 32.0 |  |
| f | 4.221 | 4.188 |  |
| f1 | 2.838 | 2.817 |  |
| f2 | −3.404 | −3.331 |  |
| TTL | 3.586 | 3.600 |  |
| LB | 1.496 | 1.451 |  |
| IH | 1.234 | 1.234 |  |

The lens assembly as provided in the present disclosure uses two lenses and has a small-size and narrow view angle less than 35°, and it is applicable to biologic characteristic identification such as vein identification or iris identification in a wavelength range from 750 nm to 900 nm.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lens assembly for biologic characteristic identification, comprising:
   a first lens with positive refractive power; and
   a second lens with negative refractive power;
   wherein the first lens and the second lens are arranged in sequence from the object side to the image side, and satisfy following conditions (1) to (4):

$$-0.95 \leq f1/f2 \leq -0.68 \quad (1)$$

$$0.10 \leq d1/f \leq 0.20 \quad (2)$$

$$0.24 \leq d2/f \leq 0.50 \quad (3)$$

$$-3.50 \leq (R1+R2)/(R1-R2) \leq -1.80 \quad (4)$$

wherein f is the focal length of the lens assembly, f1 is the focal length of the first lens, f2 is the focal length of the second lens, d1 is the central thickness of the first lens, d2 is the axial distance from the image side of the first lens to the object side of the second lens, R1 is the curvature radius of the object side of the first lens, and R2 is the curvature radius of the image side of the first lens.

2. The lens assembly for biologic characteristic identification as claimed in claim 1, further satisfying the following condition (5):

$$-1.50 \leq (R3+R4)/(R3-R4) \leq -0.50 \quad (5)$$

wherein R3 is the curvature radius of the object side of the second lens, and R4 is the curvature radius of the image side of the second lens.

3. The lens assembly for biologic characteristic identification as claimed in claim 1, further satisfying the following condition (6):

$$0.05 \leq d3/f \leq 0.30 \quad (6)$$

wherein f is the focal length of a lens assembly, and d3 is the central thickness of the second lens L2.

* * * * *